US012431676B2

(12) United States Patent
Morello et al.

(10) Patent No.: US 12,431,676 B2
(45) Date of Patent: Sep. 30, 2025

(54) RIGHT ANGLED COAXIAL ELECTRICAL CONNECTOR AND METHOD OF FORMING SAME

(71) Applicant: Aptiv Technologies AG, Schaffhausen (CH)

(72) Inventors: John Morello, Warren, OH (US); James Rainey, Warren, OH (US); Ryan Kirkpatrick, Wexford, PA (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 366 days.

(21) Appl. No.: 18/104,959

(22) Filed: Feb. 2, 2023

(65) Prior Publication Data

US 2024/0266790 A1 Aug. 8, 2024

(51) Int. Cl.

| | |
|---|---|
| ***H01R 24/40*** | (2011.01) |
| ***H01R 4/02*** | (2006.01) |
| ***H01R 9/05*** | (2006.01) |
| ***H01R 13/42*** | (2006.01) |

(52) U.S. Cl.

CPC ............. *H01R 24/40* (2013.01); *H01R 4/029* (2013.01); *H01R 9/05* (2013.01); *H01R 13/42* (2013.01)

(58) Field of Classification Search

CPC ........ H01R 24/40; H01R 24/545; H01R 9/05; H01R 4/029

USPC .................................................. 439/578, 894

See application file for complete search history.

(56) References Cited

U.S. PATENT DOCUMENTS

| | | | | |
|---|---|---|---|---|
| 9,667,000 | B1 | 5/2017 | Morello et al. | |
| 9,672,001 | B1 | 6/2017 | Stein | |
| 9,960,550 | B2 | 5/2018 | Ensley et al. | |
| 10,446,950 | B2 | 10/2019 | Morello et al. | |
| 10,680,380 | B2 | 6/2020 | Penn et al. | |
| 10,770,840 | B1 | 9/2020 | Garver et al. | |
| 10,886,668 | B1 * | 1/2021 | Morello | H01R 9/0518 |
| 11,469,557 | B2 * | 10/2022 | Morello | H01R 43/16 |
| 2016/0134032 | A1 | 5/2016 | Hall et al. | |
| 2017/0264034 | A1 | 9/2017 | Du et al. | |
| 2018/0375233 | A1 | 12/2018 | Morello et al. | |

(Continued)

OTHER PUBLICATIONS

"Extended European Search Report for Application No. 23218696.5"; European Patent Office; mailed on May 23, 2024; 10 Pages.

*Primary Examiner* — Tulsidas C Patel
*Assistant Examiner* — Thaslimur Rahman
(74) *Attorney, Agent, or Firm* — Billion & Armitage

(57) ABSTRACT

A shielded electrical connector includes a shield terminal attachment segment having a tubular first portion defining a first seam and second portion having two semicircular channels that extends from the first portion oriented at a right angle to the first axis, an inner insulator disposed within the shield terminal attachment segment, and a shield terminal connection segment having a tubular third portion and a second seam formed separately from the shield terminal attachment segment and attached to the shield terminal attachment segment such that the third portion is coaxial with the first portion. Edges of the first seam and edges of the two semicircular channels are joined by the attachment of the shield terminal connection segment to the shield terminal attachment segment. A method of forming the shielded electrical connector is also provided.

18 Claims, 7 Drawing Sheets

(56) References Cited

U.S. PATENT DOCUMENTS

| | | | | |
|---|---|---|---|---|
| 2022/0352655 | A1 | 11/2022 | Morello et al. | |
| 2023/0010967 | A1* | 1/2023 | Morello ................. | H01R 4/023 |

* cited by examiner

RIGHT ANGLED COAXIAL ELECTRICAL CONNECTOR AND METHOD OF FORMING SAME

TECHNICAL FIELD

This application is directed to a right angled coaxial electrical connector and a method of forming the right angled coaxial electrical connector.

BACKGROUND

Coaxial cable connector assemblies have been used for numerous automotive applications, such as navigation systems, infotainment systems, air bag systems, and other systems requiring electronic data transmission. Coaxial cables typically consist of an outer shield conductor, an inner center conductor, a dielectric, and an insulation jacket. The outer conductor and the inner conductor of the coaxial cable often electrically interface with a mating coaxial cable through a coaxial connector assembly.

Radio Frequency (RF) connectors most often referred to simply as RF connectors are often used to connect coaxial cables while providing a certain degree of shielding. The use of RF connectors for coaxial cable has greatly increased in automotive applications as devices requiring high speed data communication continue to proliferate.

The use of RF connectors for automotive usage has become so common that standards for signal loss and contact resistance have been devised. Some RF connectors that meet these specifications use high cost cold drawn tubular shield terminals. Lower cost stamped shield terminals are also used.

RF connectors need to be properly seated to provide adequate shielding i.e, improper seating between shield terminals can cause significant RF leakage. Thus, RF connectors use strict manufacturing tolerances to assure proper seating which drives costs up of each RF connector.

Therefore, a low cost RF connector having stamped terminal connectors which meets all performance specifications and has improved shielding remains desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY

According to one or more aspects of the present disclosure, a method of forming a shielded electrical connector configured to receive a corresponding shielded electrical connector includes:

cutting an attachment shield terminal preform and a connection shield terminal preform from one or more planar sheets of metal;

forming the attachment shield terminal preform into a shield terminal attachment segment having a substantially tubular first portion defining a first axis and a first seam and second portion having two semicircular channels that extends from the first portion defining a second axis that is oriented at a right angle to the first axis;

forming the connection shield terminal preform into a shield terminal connection segment having a substantially tubular third portion having a third axis and a second seam; inserting an inner insulator within the shield terminal attachment segment;

joining edges of the first seam and joining the two semicircular channels to form a tubular shape; and attaching the shield terminal connection segment to the shield terminal attachment segment such that the third axis is coaxial with the first axis.

In some aspects of the method described in the preceding paragraph, the method further includes welding the shield terminal connection segment to the shield terminal attachment segment.

In some aspects of the method described in any one of the preceding paragraphs, the method further includes arranging the second seam opposite to the first seam.

In some aspects of the method described in any one of the preceding paragraphs, the inner insulator is inserted within the shield terminal attachment segment in a direction parallel to the first axis.

In some aspects of the method described in any one of the preceding paragraphs, the inner insulator is inserted within the shield terminal attachment segment in a direction parallel to the second axis.

In some aspects of the method described in any one of the preceding paragraphs, the inner insulator defines a first cavity aligned with the first axis and a second cavity intersecting the first cavity. The second cavity is aligned with the second axis. The method further includes:

inserting a first terminal within the first cavity; inserting a second terminal attached to a central conductor of a coaxial cable within the second cavity; and interconnecting the first terminal with the second terminal.

In some aspects of the method described in the preceding paragraph, the method further includes arranging shield conductor of the coaxial cable to surround the second portion; and attaching the shield conductor to the second portion.

In some aspects of the method described in any one of the preceding paragraphs, edges of the two semicircular channels define interlocking teeth extending therefrom.

According to one or more aspects of the present disclosure, a shielded electrical connector is configured to be received within a corresponding shielded electrical connector. The shielded electrical connector is formed by a method including:

cutting an attachment shield terminal preform and a connection shield terminal preform from one or more planar sheets of metal;

forming the attachment shield terminal preform into a shield terminal attachment segment having a substantially tubular first portion defining a first axis and a first seam and second portion having two semicircular channels that extends from the first portion defining a second axis that is oriented at a right angle to the first axis;

forming the connection shield terminal preform into a shield terminal connection segment having a substantially tubular third portion having a third axis and a second seam; inserting an inner insulator within the shield terminal attachment segment;

joining edges of the first seam and joining the two semicircular channels to form a tubular shape; and attaching the shield terminal connection segment to the shield terminal attachment segment such that the third axis is coaxial with the first axis.

In some aspects of the method described in the preceding paragraph, the method further includes welding the shield terminal connection segment to the shield terminal attachment segment.

In some aspects of the method described in any one of the preceding paragraphs, the method further includes arranging the second seam opposite to the first seam.

In some aspects of the method described in any one of the preceding paragraphs, the inner insulator is inserted within the shield terminal attachment segment in a direction parallel to the first axis.

In some aspects of the method described in any one of the preceding paragraphs, the inner insulator is inserted within the shield terminal attachment segment in a direction parallel to the second axis.

In some aspects of the method described in any one of the preceding paragraphs, the inner insulator defines a first cavity aligned with the first axis and a second cavity intersecting the first cavity, wherein the second cavity is aligned with the second axis. The method further includes:

inserting a first terminal within the first cavity; inserting a second terminal attached to a central conductor of a coaxial cable within the second cavity; and interconnecting the first terminal with the second terminal.

In some aspects of the method described in any one of the preceding paragraphs, the method further includes arranging shield conductor of the coaxial cable to surround the second portion; and attaching the shield conductor to the second portion.

In some aspects of the method described in any one of the preceding paragraphs, edges of the two semicircular channels define interlocking teeth extending therefrom.

According to one or more aspects of the present disclosure, a shielded electrical connector configured to receive a corresponding shielded electrical connector, includes a shield terminal attachment segment formed from sheet metal having a substantially tubular first portion defining a first axis and a first seam and second portion having two semicircular channels that extends from the first portion defining a second axis that is oriented at a right angle to the first axis;

an inner insulator disposed within the shield terminal attachment segment; and a shield terminal connection segment having a substantially tubular third portion having a third axis and a second seam formed separately from the shield terminal attachment segment from sheet metal and attached to the shield terminal attachment segment such that the third axis is coaxial with the first axis. Edges of the first seam and edges of the two semicircular channels are joined by the attachment of the shield terminal connection segment to the shield terminal attachment segment.

In some aspects of the shielded electrical connector described in the preceding paragraph, the inner insulator defines a first cavity aligned with the first axis and a second cavity intersecting the first cavity, wherein the second cavity is aligned with the second axis and wherein the shielded electrical connector further includes: a first terminal disposed within the first cavity; and a second terminal attached to a central conductor of a coaxial cable, disposed within the second cavity, and interconnected to the first terminal.

In some aspects of the shielded electrical connector described in any one of the preceding paragraphs, a shield conductor of the coaxial cable surrounds the second portion and is attached to the second portion by an outer ferrule.

In some aspects of the shielded electrical connector described in any one of the preceding paragraphs, a joint between the shield terminal connection segment and shield terminal attachment segment defines a locking edge substantially perpendicular to the first axis and the third axis.

BRIEF DESCRIPTION OF THE DRAWINGS

The present invention will now be described, by way of example with reference to the accompanying drawings, in which.

DETAILED DESCRIPTION

Figure 1:
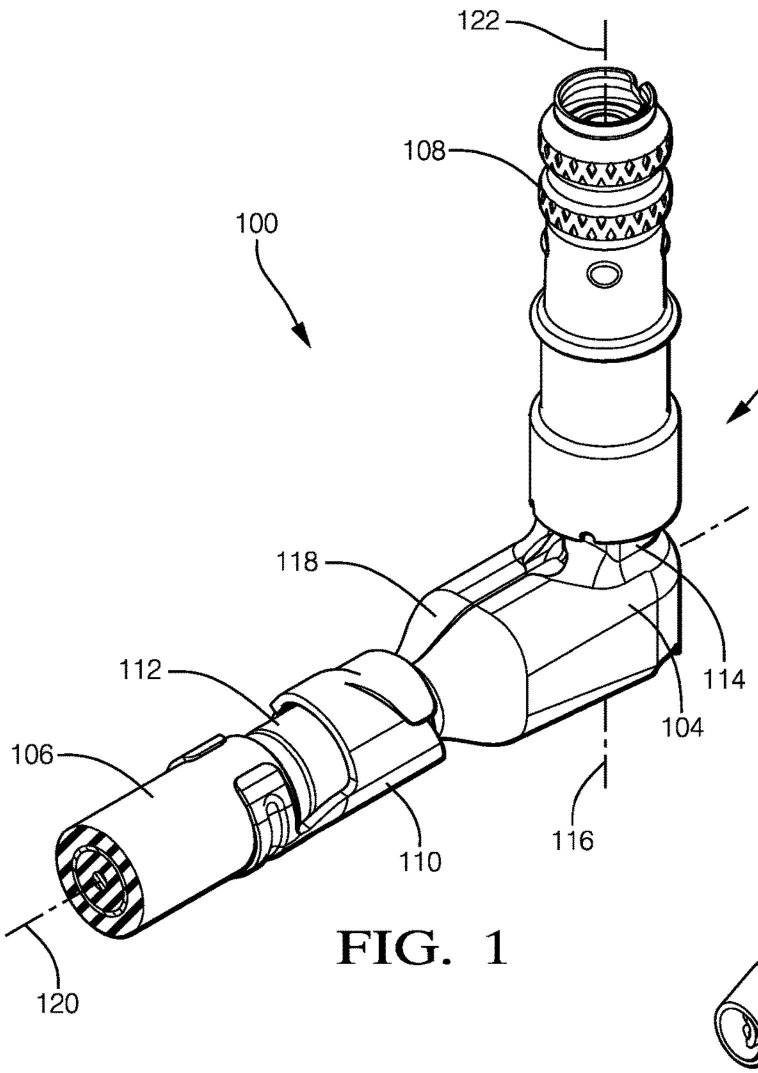
FIG. 1 illustrates an isometric view of a right angled coaxial electrical connector assembly according to some embodiments.
Figure 7:
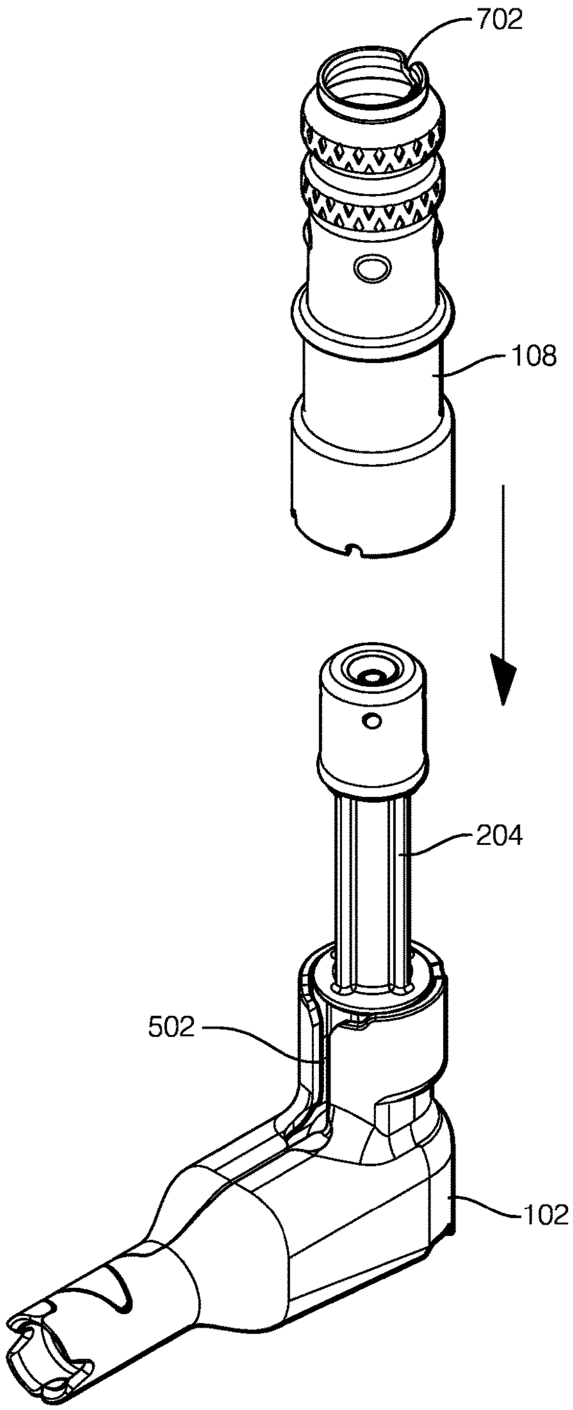
FIG. 7 illustrates an exploded view of the insulator/first central terminal portion assembly within the first shield terminal portion of FIG. 5 and a second shield terminal portion according to some embodiments.

FIG. 1 illustrates a non-limiting example of a right angled coaxial electrical connector assembly, hereafter referred to as the assembly 100. The assembly 100 includes a two-piece shield terminal 102 formed from planar sheet metal preforms using known sheet metal forming processes, such as stamping, rolling, etc. The sheet metal may be a tin-plated copper alloy. The shield terminal 102 has a shield terminal attachment segment 104 attached to a coaxial cable 106 and a shield terminal connection segment 108 configured to interface with a corresponding mating shield terminal (not shown). The coaxial cable 106 is attached to the shield terminal 102 by an outer ferrule 110 that is crimped to the shield terminal attachment segment 104, thereby securing a shield conductor 112 of the coaxial cable 106 to the shield terminal 102. The shield terminal attachment segment 104 has a substantially tubular first portion 114 defining a first axis 116 and a first seam 502 best seen in FIG. 5. The shield terminal attachment segment 104 also has a second portion 118 having two semicircular channels 504 that extend from the first portion 114 also best seen in FIG. 5 and define a second axis 120 that is oriented at a right angle to the first axis 116 of the first portion 114. The shield terminal connection segment 108 is formed from sheet metal separately from the shield terminal attachment segment 104. The shield terminal connection segment 108 defines a third axis 122 and a second seam 702, best seen in FIG. 7. The shield terminal connection segment 108 is attached to the shield terminal attachment segment 104 such that the third axis 122 of the shield terminal connection segment 108 is coaxial with the first axis 116 of the first portion 114 of the shield terminal attachment segment 104.

Figure 2:
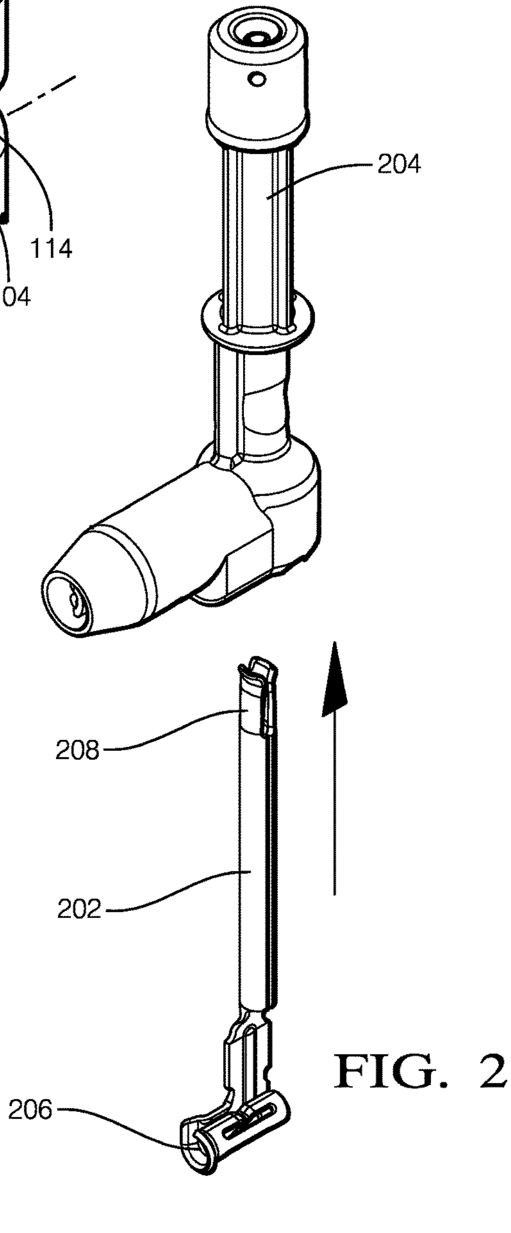
FIG. 2 illustrates a partial exploded view of an insulator and first central terminal portion of the right angled coaxial electrical connector of FIG. 1 according to some embodiments.

As shown in FIG. 2, the assembly 100 further includes a two-piece signal terminal located within an L-shaped inner insulator 204. The inner insulator 204 defines a first cavity 402 that is aligned with the first axis 116 and further defines a second cavity 404 aligned with the second axis 120. The second cavity 404 intersects and is interconnected with the first cavity 402. The signal terminal has a signal terminal attachment segment 902 that is attached to the central signal conductor 904 of the coaxial cable 106 that is disposed within the first cavity 402 and a signal terminal connection segment 202 that is disposed within the second cavity 404. The signal terminal connection segment 202 is configured to receive the signal terminal attachment segment 902 (see FIG. 9) in a first end 206 and a corresponding mating connection terminal in a second end 208. The signal terminal connection segment 202 and signal terminal attachment segment 902 may also formed from planar sheet metal preforms using known sheet metal forming processes, such as stamping, rolling, etc. The inner insulator 204 may be formed of an electrically insulative polymer, such as 20% glass filled polybutylene terephthalate (PBT).

Figure 3:
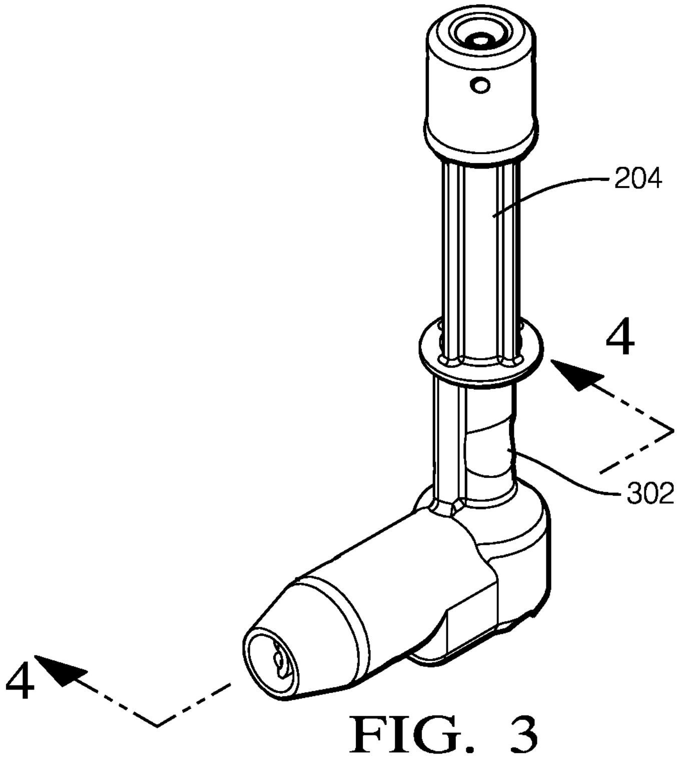
FIG. 3 illustrates an assembled view of the insulator and first central terminal portion of FIG. 2 according to some embodiments.
Figure 4:
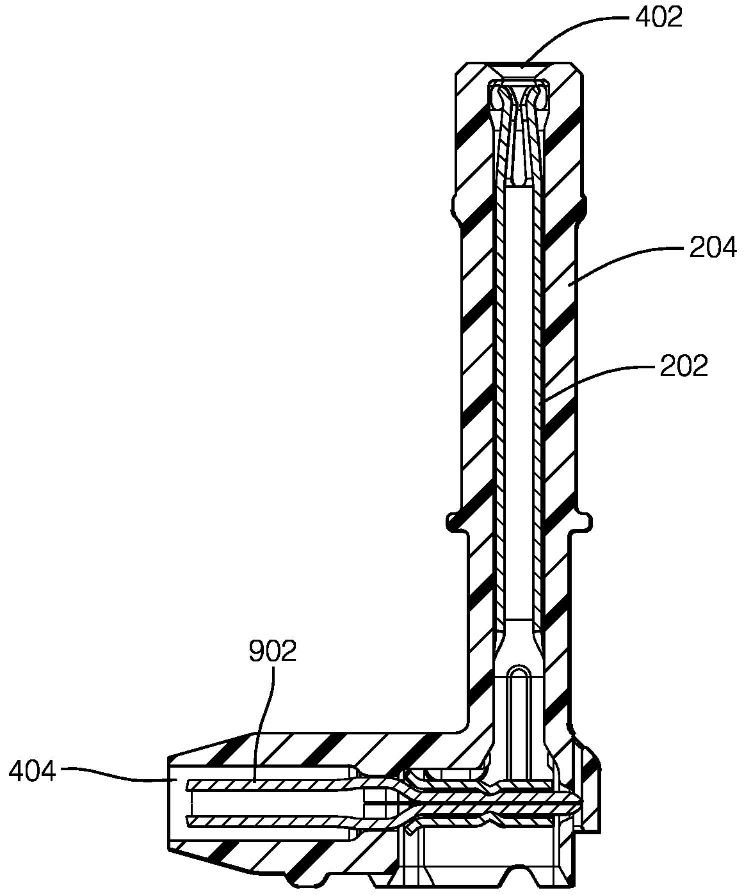
FIG. 4 illustrates a cross-section view of the insulator/first central terminal portion assembly of FIG. 3 according to some embodiments.

FIGS. 2 through 14 illustrate the steps in assembling the right angled coaxial electrical connector assembly 100. As shown in FIG. 2, the signal terminal connection segment 202 is inserted within the second cavity 404 in the inner insulator 204 as shown in FIGS. 3 and 4. An indentation 302 is made in the inner insulator 204, preferably using a cold forming process, to secure the signal terminal connection segment 202 within the second cavity 404 of the inner insulator 204.

Figure 6:
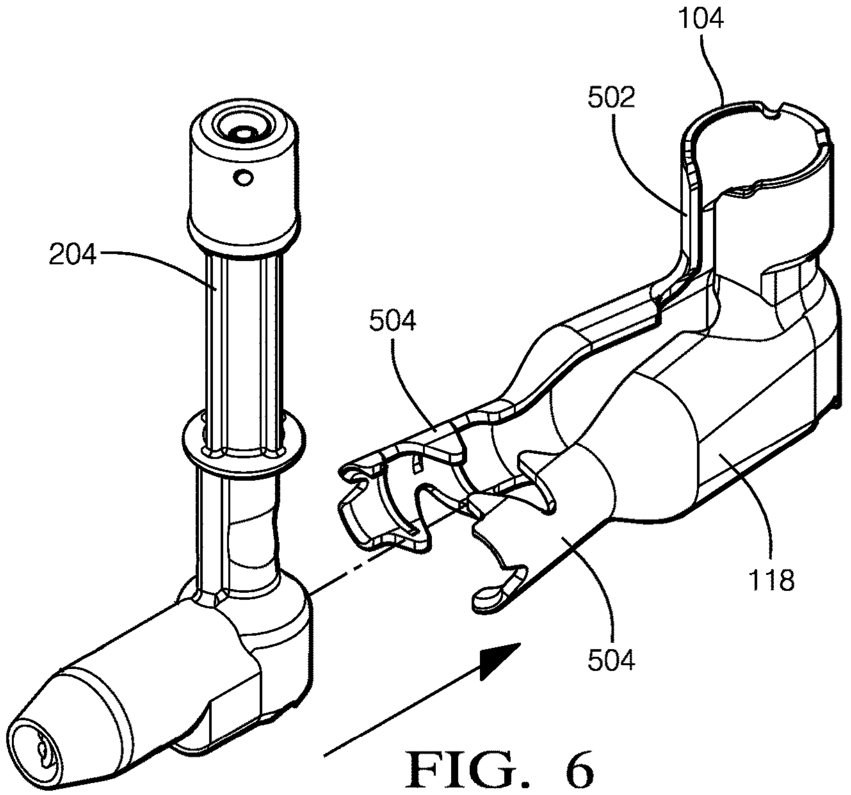
FIG. 6 illustrates another exploded view of the insulator/first central terminal portion assembly of FIG. 3 and the first shield terminal portion of FIG. 5 according to some embodiments.
Figure 5:
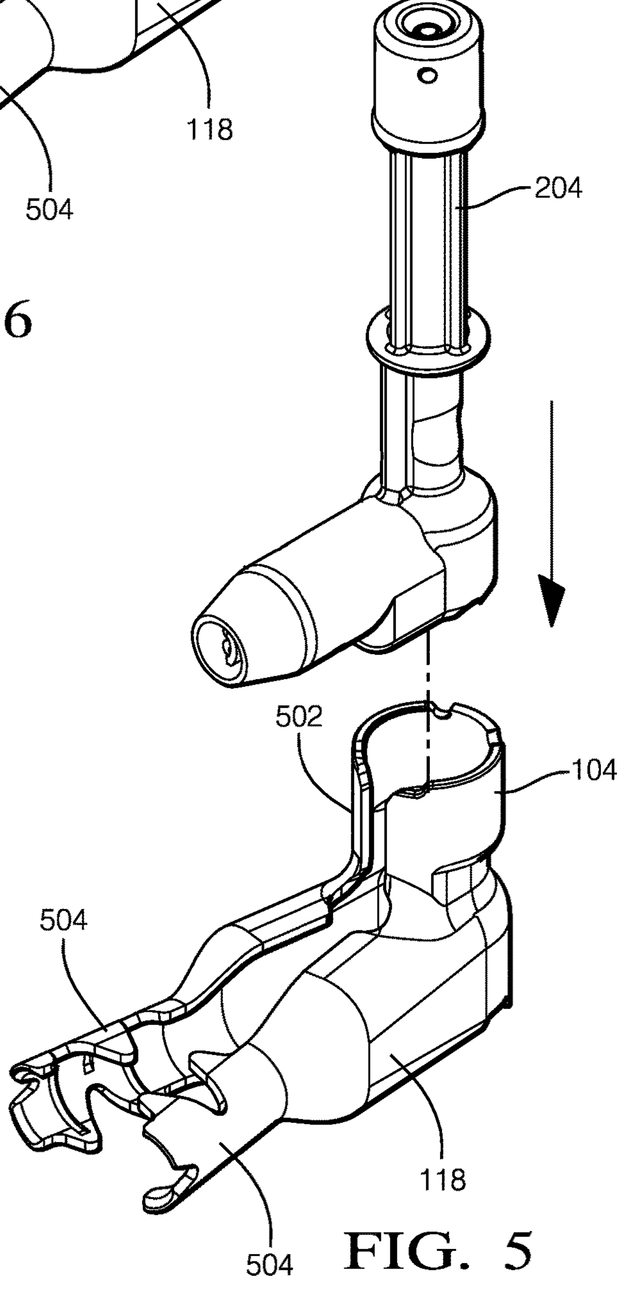
FIG. 5 illustrates an exploded view of the insulator/first central terminal portion assembly of FIG. 3 and a first shield terminal portion according to some embodiments.

FIGS. 5 and 6 show the inner insulator 204 containing the signal terminal connection segment 202 being inserted within the shield terminal attachment segment 104. The two semicircular channels 504 and the first seam 502 are spread apart far enough so that the inner insulator 204 may be inserted in the shield terminal attachment segment 104 either along the first axis 116 as shown in FIG. 5 or along the second axis 120 as shown in FIG. 6.

Figure 8:
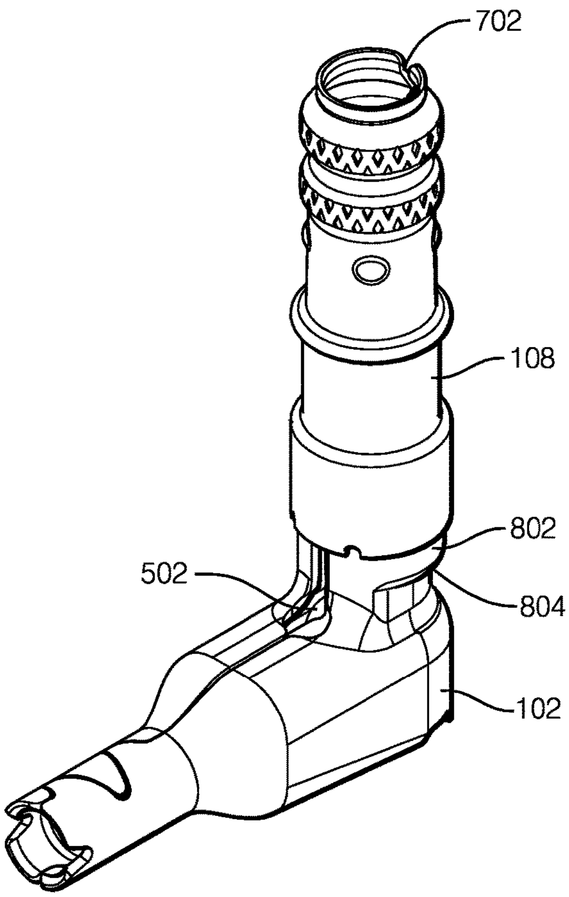
FIG. 8 illustrates an isometric view of a right angled coaxial electrical connector having the insulator/first central terminal portion assembly disposed within the assembled first and second shield terminal portions according to some embodiments.

After the inner insulator 204 is disposed in the shield terminal attachment segment 104, the edges of the first seam 502 of the first portion 114 and the two semicircular channels 504 are brought together to enclose the inner insulator 204 in the shield terminal attachment segment 104. The shield terminal connection segment 108 is then attached to the first portion 114 of the shield terminal attachment segment 104, thereby holding the edges of the first seam 502 and the two semicircular channels 504 together. The third axis 122 of the shield terminal connection segment 108 is coaxial with the first axis 116 of the first portion 114 of the shield terminal attachment segment 104. The second seam 702 of the shield terminal connection segment 108 is preferably arranged so that it is oriented opposite to the first seam 502 of the first portion 114 of the shield terminal attachment segment 104. The shield terminal connection segment 108 is preferably welded to the shield terminal attachment segment 104 in order to secure the shield terminal connection segment 108 to the shield terminal attachment segment 104 as shown in FIG. 8. A joint between the shield terminal connection segment 108 and shield terminal attachment segment 104 defines a locking edge 802 that is arranged substantially perpendicular to the first axis 116 and the third axis 122 and a recess 804 configured to add clearance for a mating housing lock (not shown). The recess 804 is centered opposite the first seam 502 and wraps about 300 degrees around the tubular first portion 114 of the shield terminal attachment segment 104. Axially, the recess 804 is located at the locking edge 802. The tip of the shield terminal connection segment 108 has a knurled pattern 806 configured to improve electrical conductivity between the shield terminal connection segment 108 and the corresponding mating shield terminal. The shield terminal connection segment 108 may also define a number of embossments 808 evenly spaced around the first axis that are configured to provide a stable connection between the shield terminal connection segment 108 and the corresponding mating shield terminal.

Figure 9:
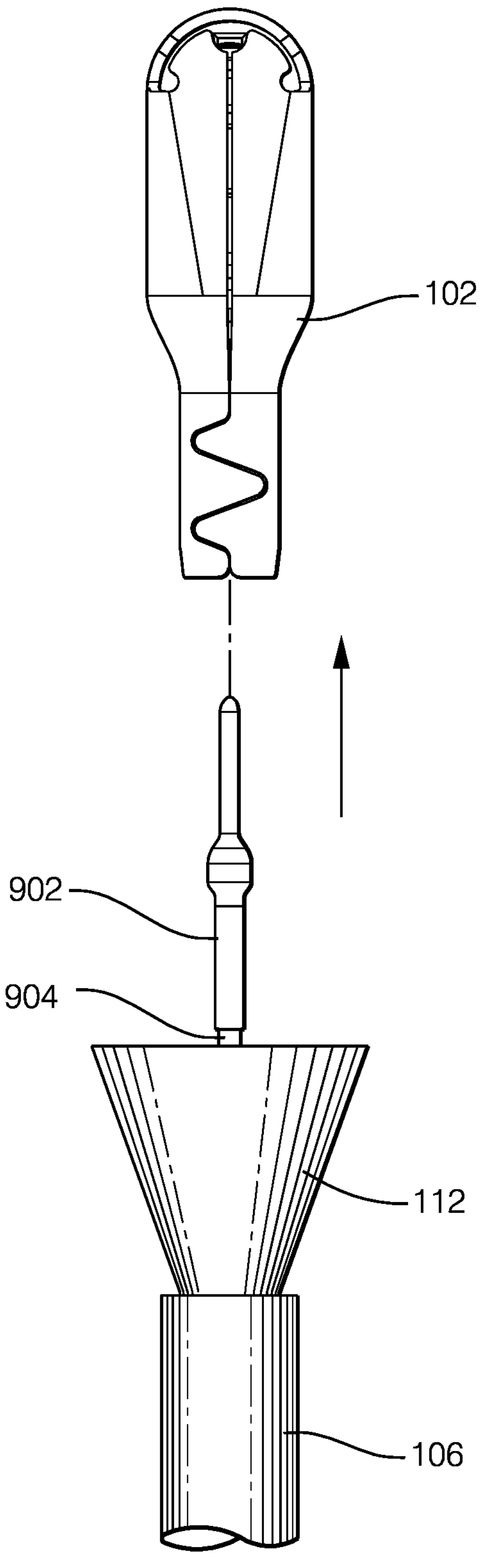
FIG. 9 illustrates a bottom view of the right angled coaxial electrical connector of FIG. 8 and a coaxial cable terminated by a second central terminal portion according to some embodiments.
Figure 10:
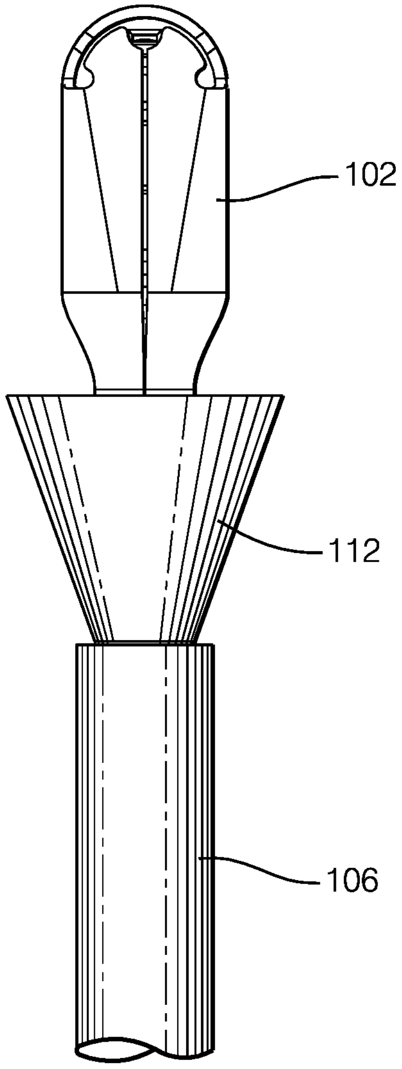
FIG. 10 illustrates a bottom view of the right angled coaxial electrical connector and coaxial cable of FIG. 9 having the second central terminal portion mated with the central terminal portion according to some embodiments.
Figure 11:
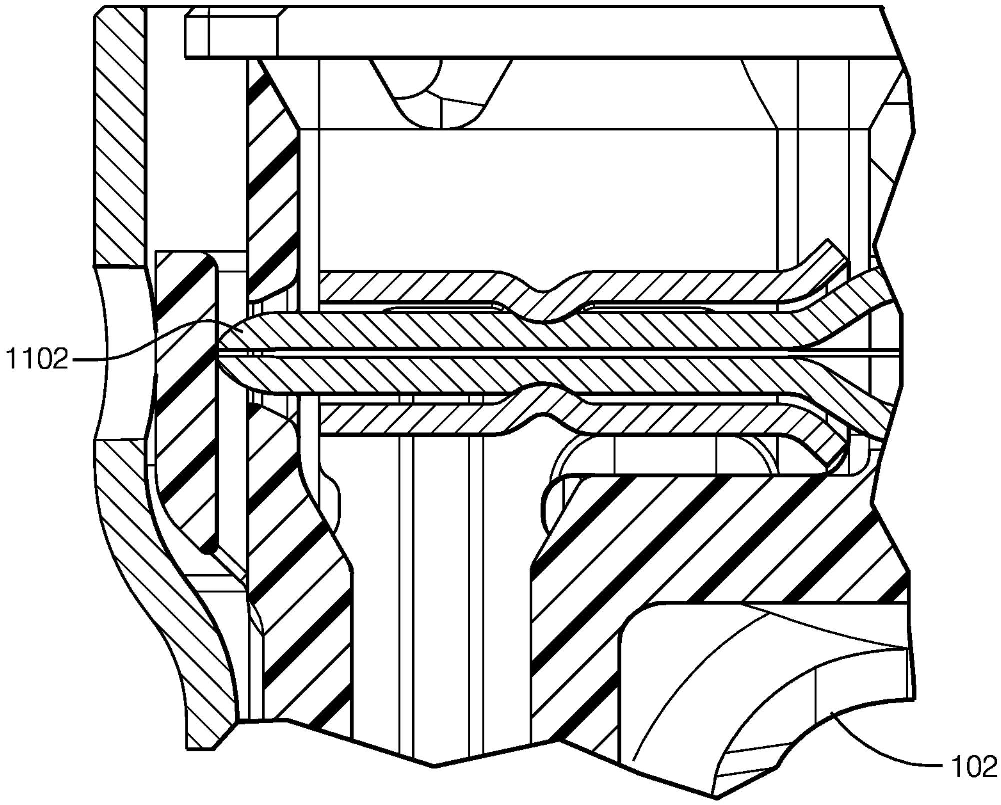
FIG. 11 illustrates cross-section view of the right angled coaxial electrical connector according to some embodiments.
Figure 12:
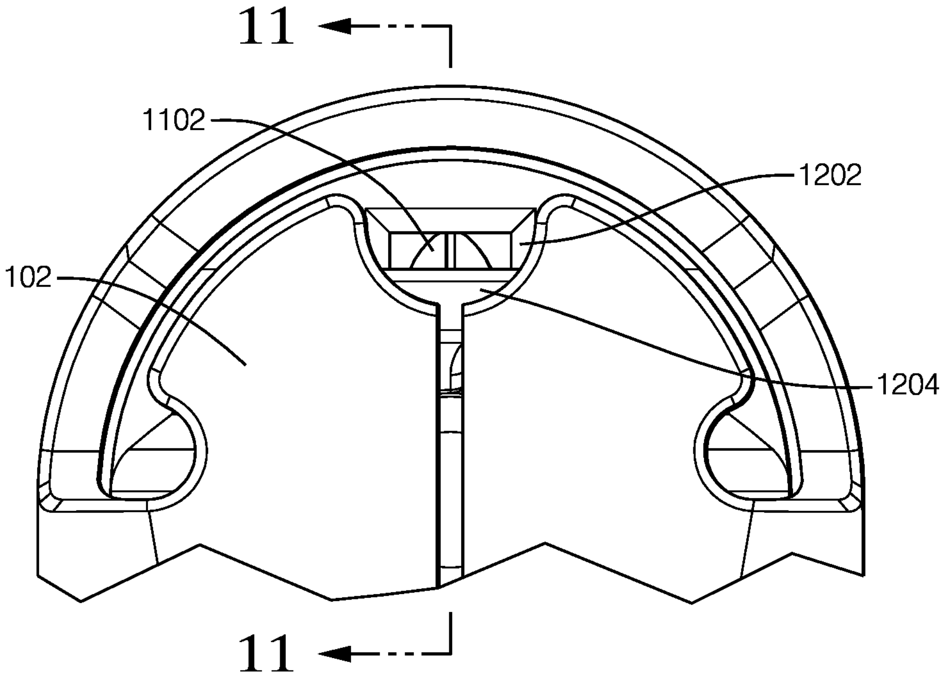
FIG. 12 illustrates a close-up view of a viewing port in the right angled coaxial electrical connector configured to provide visual confirmation that the second central terminal portion is properly mated with the central terminal portion according to some embodiments.

FIG. 9 illustrates the insertion of the signal terminal attachment segment 902 within the shield terminal attachment segment 104, the second cavity 404 of inner insulator 204, and the signal terminal connection segment 202. The shield conductor 112 of the coaxial cable 106 is flared so that the two semicircular channels 504 may be received under the shield conductor 112 as shown in FIG. 10. As the signal terminal attachment segment 902 is received within the first end 206 (see FIG. 2) of the signal terminal connection segment 202 as shown in FIG. 11, the tip 1102 of the signal terminal attachment segment 902 extends beyond the first end 206 of the signal terminal connection segment 202 and is visible through aligned portals 1202, 1204 defined in the bottom of the inner insulator 204 and the shield terminal attachment segment 104 as shown in FIG. 12. The edges of the semicircular channels 504 have teeth 906 that are configured to inhibit the shield conductor 112 from getting between the edges of the semicircular channels 504 as the signal terminal attachment segment 902 is inserted within the shield terminal attachment segment 104. In FIG. 11, the signal terminal connection segment 202 appears to be in two separate pieces, however that is due to the location of the section plane and the geometry of the signal terminal connection segment 202 in that "missing" region. The signal terminal connection segment 202 is a single piece as shown in FIG. 2.

Figure 13:
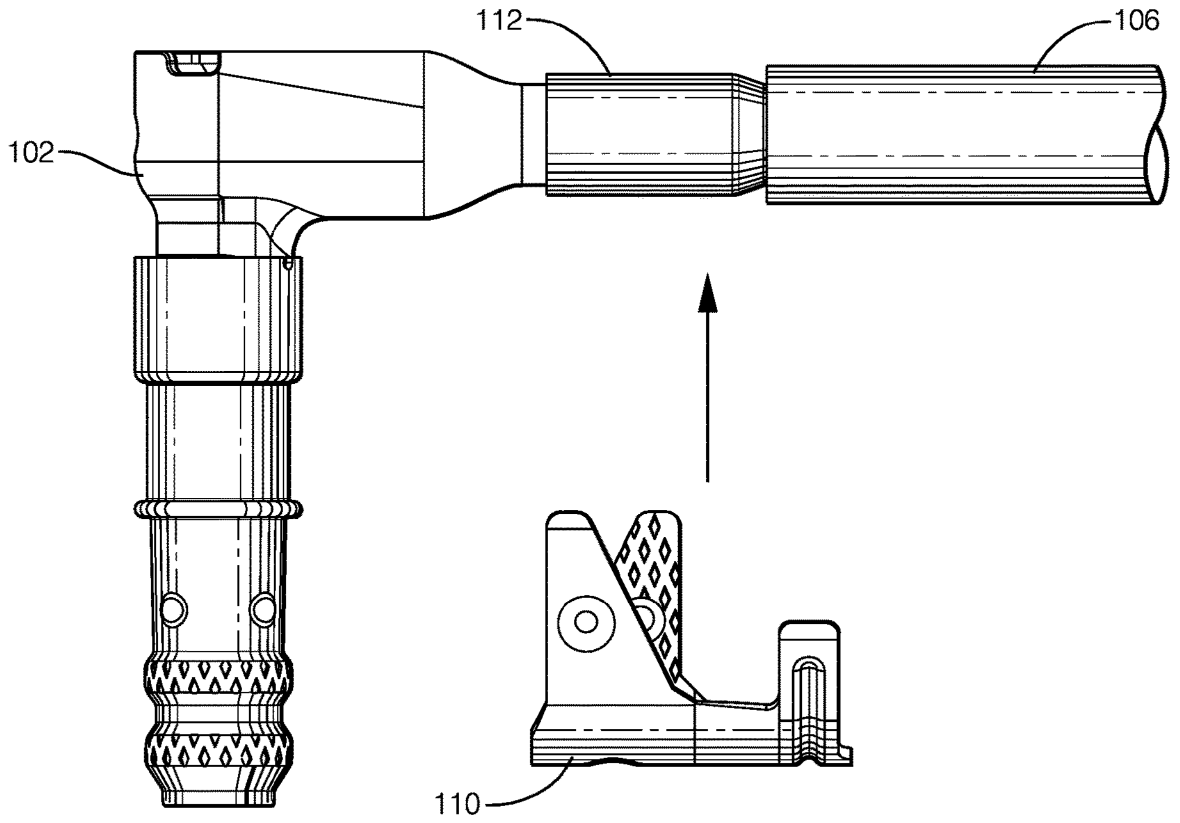
FIG. 13 illustrates an exploded view of the right angled coaxial electrical connector and coaxial cable of FIG. 10 and an outer ferrule configured to attach the coaxial cable to the right angled coaxial electrical connector according to some embodiments.
Figure 14:
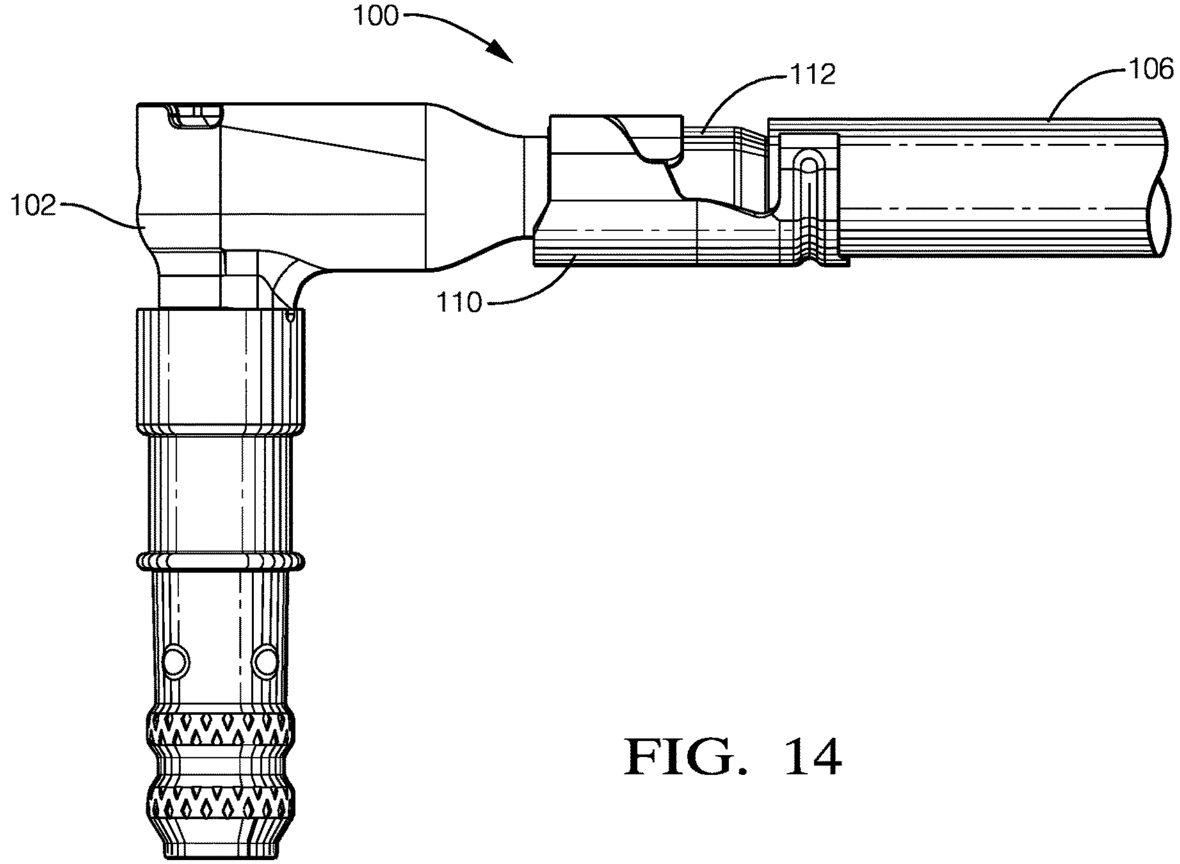
FIG. 14 illustrates side view of the right angled coaxial electrical connector assembly with the outer ferrule crimped to the right angled coaxial electrical connector according to some embodiments.

The shield conductor 112 of the coaxial cable 106 is then attached to the shield terminal attachment segment 104 by a U-shaped outer ferrule 110 that is crimped over the shield conductor 112 as shown in FIGS. 13 and 14.

The right angled coaxial electrical connector assembly 100 described herein provides the advantages of being adaptable to various application due to the two-piece shield terminal 102. The shape of the shield terminal connection segment 108 may be changed to interface different corresponding mating shield terminal while the shield terminal attachment segment 104 is unchanged and is common to various configurations. The shield terminal connection segment 108 may be adapted to accommodate different shield diameters of corresponding mating shield terminal. The shape of the shield terminal connection segment 108 may also be changed be a female shield terminal attachment segment 104 rather than the male shield terminal attachment segment 104 illustrated in the figures. The design of the right angled coaxial electrical connector assembly 100 also allows a male signal terminal connection segment to be used rather than the illustrated female signal terminal connection segment 202 while still retaining the common shield terminal attachment segment 104.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A method of forming a shielded electrical connector configured to receive a corresponding shielded electrical connector, comprising:

forming a shield terminal attachment segment having a substantially tubular first portion defining a first axis and a first seam and second portion having two semicircular channels that extends from the first portion defining a second axis that is oriented at a right angle to the first axis;

forming a shield terminal connection segment having a substantially tubular third portion having a third axis and a second seam;

inserting an inner insulator within the shield terminal attachment segment;

joining edges of the first seam and joining the two semicircular channels to form a tubular shape;

arranging the second seam opposite to the first seam; and attaching the shield terminal connection segment to the shield terminal attachment segment such that the third axis is coaxial with the first axis.

2. The method according to claim 1, further comprising:

welding the shield terminal connection segment to the shield terminal attachment segment.

3. The method according to claim 1, wherein the inner insulator is inserted within the shield terminal attachment segment in a direction parallel to the first axis.

4. The method according to claim 1, wherein the inner insulator is inserted within the shield terminal attachment segment in a direction parallel to the second axis.

5. The method according to claim 1, wherein the inner insulator defines a first cavity aligned with the first axis and a second cavity intersecting the first cavity, wherein the second cavity is aligned with the second axis, and wherein the method further comprises:

inserting a first terminal within the first cavity;

inserting a second terminal attached to a central conductor of a coaxial cable within the second cavity; and interconnecting the first terminal with the second terminal.

6. The method according to claim 5, further comprising:

arranging a shield conductor of the coaxial cable to surround the second portion; and attaching the shield conductor to the second portion.

7. The method according to claim 1, wherein edges of the two semicircular channels define interlocking teeth extending therefrom.

8. A shielded electrical connector configured to be received within a corresponding shielded electrical connector, the shielded electrical connector formed by a method comprising:

forming a shield terminal attachment segment having a substantially tubular first portion defining a first axis and a first seam and second portion having two semicircular channels that extends from the first portion defining a second axis that is oriented at a right angle to the first axis;

forming a shield terminal connection segment having a substantially tubular third portion having a third axis and a second seam;

inserting an inner insulator within the shield terminal attachment segment;

joining edges of the first seam and joining the two semicircular channels to form a tubular shape;

arranging the second seam opposite to the first seam; and attaching the shield terminal connection segment to the shield terminal attachment segment such that the third axis is coaxial with the first axis.

9. The shielded electrical connector according to claim 8, the method further comprising:

welding the shield terminal connection segment to the shield terminal attachment segment.

10. The shielded electrical connector according to claim 8, wherein the inner insulator is inserted within the shield terminal attachment segment in a direction parallel to the first axis.

11. The shielded electrical connector according to claim 8, wherein the inner insulator is inserted within the shield terminal attachment segment in a direction parallel to the second axis.

12. The shielded electrical connector according to claim 8, wherein the inner insulator defines a first cavity aligned with the first axis and a second cavity intersecting the first cavity, wherein the second cavity is aligned with the second axis, and wherein the method further comprises:

inserting a first terminal within the first cavity;

inserting a second terminal attached to a central conductor of a coaxial cable within the second cavity; and interconnecting the first terminal with the second terminal.

13. The shielded electrical connector according to claim 12, the method further comprising:

arranging a shield conductor of the coaxial cable to surround the second portion; and attaching the shield conductor to the second portion.

14. The shielded electrical connector according to claim 8, wherein edges of the two semicircular channels define interlocking teeth extending therefrom.

15. A shielded electrical connector configured to receive a corresponding shielded electrical connector, comprising:

a shield terminal attachment segment formed from sheet metal having a substantially tubular first portion defining a first axis and a first seam and second portion having two semicircular channels that extends from the first portion defining a second axis that is oriented at a right angle to the first axis;

an inner insulator disposed within the shield terminal attachment segment; and a shield terminal connection segment having a substantially tubular third portion having a third axis and a second seam formed separately from the shield terminal attachment segment from sheet metal and attached to the shield terminal attachment segment such that the third axis is coaxial with the first axis and the second seam is arranged opposite to the first seam, wherein edges of the first seam and edges of the two semicircular channels are joined by the attachment of the shield terminal connection segment to the shield terminal attachment segment.

16. The shielded electrical connector according to claim 15, wherein the inner insulator defines a first cavity aligned with the first axis and a second cavity intersecting the first cavity, wherein the second cavity is aligned with the second axis and wherein the shielded electrical connector further comprises:

a first terminal disposed within the first cavity; and a second terminal attached to a central conductor of a coaxial cable, disposed within the second cavity, and interconnected to the first terminal.

17. The shielded electrical connector according to claim 16, wherein a shield conductor of the coaxial cable surrounds the second portion and is attached to the second portion by an outer ferrule.

18. The shielded electrical connector according to claim 15, wherein a joint between the shield terminal connection segment and shield terminal attachment segment defines a locking edge substantially perpendicular to the first axis and the third axis.

* * * * *